J. L. WHEELER AND E. A. REED.
FABRIC MEASURING AND COST COMPUTING MACHINE.
APPLICATION FILED JUNE 7, 1920.

1,413,307.

Patented Apr. 18, 1922.
4 SHEETS—SHEET 1.

Inventors,
John L. Wheeler,
Edwin A. Reed,
by Elliott & Ammen
Attys.

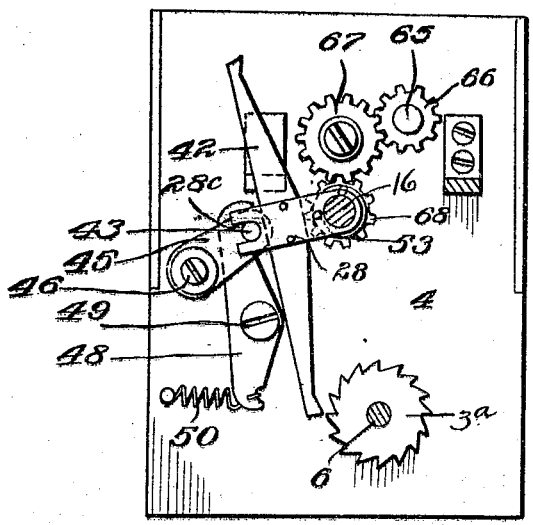
Fig. 5.
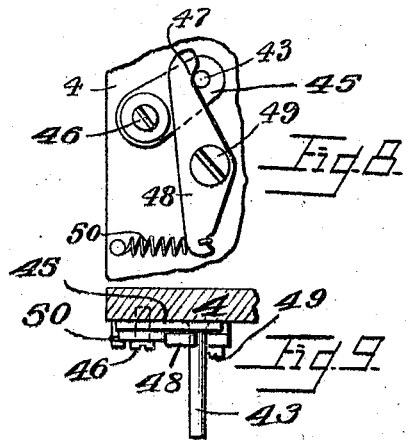
Fig. 8.
Fig. 9.
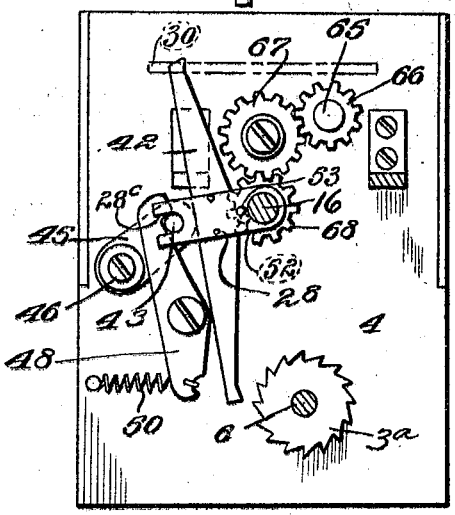
Fig. 7.
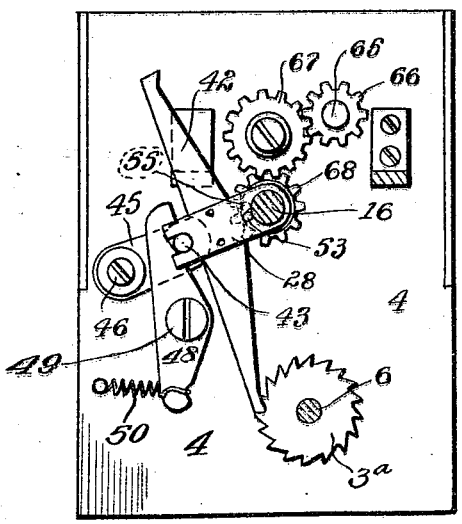
Fig. 6.
Inventors;
John L. Wheeler,
Edwin A. Reed,
by
Att'ys.

J. L. WHEELER AND E. A. REED.
FABRIC MEASURING AND COST COMPUTING MACHINE.
APPLICATION FILED JUNE 7, 1920.
1,413,307.
Patented Apr. 18, 1922.
4 SHEETS—SHEET 4.
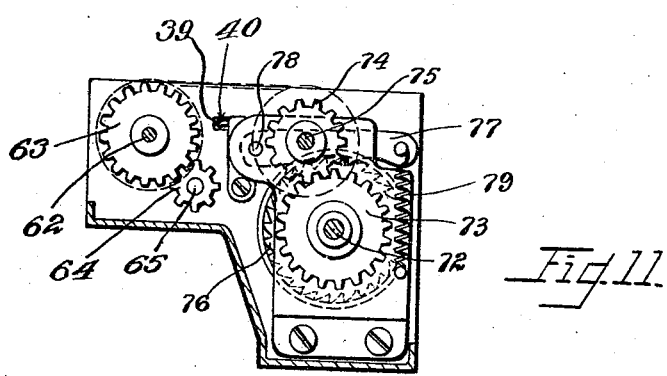
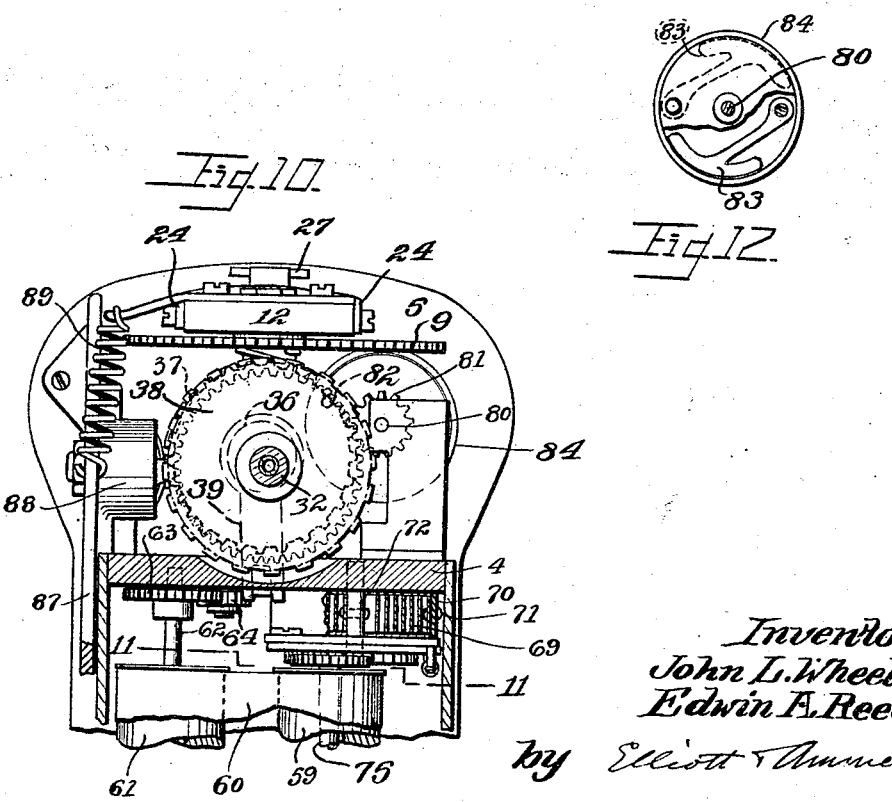
Inventors,
John L. Wheeler,
Edwin A. Reed
by Elliott & Ammen
Att'ys.

UNITED STATES PATENT OFFICE.

JOHN L. WHEELER, OF ST. LOUIS, AND EDWIN A. REED, OF MAPLEWOOD, MISSOURI, ASSIGNORS TO THE MEASUREGRAPH COMPANY, OF ST. LOUIS, MISSOURI, A CORPORATION.

FABRIC-MEASURING AND COST-COMPUTING MACHINE.

1,413,307.

Specification of Letters Patent. Patented Apr. 18, 1922.

Application filed June 7, 1920. Serial No. 387,227.

*To all whom it may concern:*

Be it known that we, JOHN L. WHEELER and EDWIN A. REED, citizens of the United States, residing in the cities of St. Louis and Maplewood, respectively, and State of Missouri, have invented new and useful Improvements in Fabric-Measuring and Cost-Computing Machines, of which the following is a specification.

This invention relates to fabric measuring and cost computing machines. These machines usually embody in their construction, a measuring roller which is rotated as the fabric passes through the machine, and the rotation of the measuring roller is imparted to indicating mechanism that indicates the length or selling charge of the piece of goods measured. The driving mechanism, as heretofore constructed, includes a considerable train of gears and co-operating pinions to effect the necessary reduction of the movement for driving the indicating pointers or an indicating chart. After a measuring movement the indicating mechanism is returned to the zero position; in returning, the mechanism is prevented from racing by means of a centrifugal governor. The general object of the present invention is to simplify the driving mechanism so as to enable a number of the co-operating gear wheels to be eliminated, to the end that a very simple and compact mechanism is produced for driving the indicating mechanism; our object also is to provide a more effective location for the returning means that returns the indicating mechanism to zero and a more effective location for the centrifugal governor that prevents the racing of the indicating mechanism in returning to the zero position. An important object of the invention is to provide simple and efficient stop mechanism for stopping the indicating mechanism in the zero position in its returning movement and for stopping the same also at the limit of the measuring capacity of the machine.

Further objects of the invention will appear hereinafter.

The invention consists in the novel features, and in the general combination of parts to be particularly described hereinafter, all of which contribute to produce a simple and efficient fabric measuring or cost computing machine. A preferred embodiment of our invention will be particularly described in the following specification, while the broad scope of our invention will be pointed out in the appended claims.

In the drawing,

Figure 5 is an elevation of the main frame looking at the left hand side of the main frame plate 4 as seen in Figure 2 and particularly illustrating the means for stopping the indicating mechanism at the zero position and at the limit of the measuring capacity of the machine; this view shows the parts of the stop mechanism in the neutral position;

Figure 6 is a view similar to Figure 5, but showing the stop mechanism in the act of stopping the measuring roller and the indicating mechanism at the limit of the measuring capacity of the machine;

Figure 7 is a view similar to Figures 5 and 6, but showing the stop mechanism in the act of stopping the indicating mechanism at the zero position;

Figure 8 is a fragmentary view in elevation further illustrating details of the stop mechanism;

Figure 9 is a plan of the parts shown in Figure 8 with a portion of the frame plate shown in section;

Figure 10 is a plan of the machine in partial section of the mechanism, certain parts being broken away;

Figure 4:
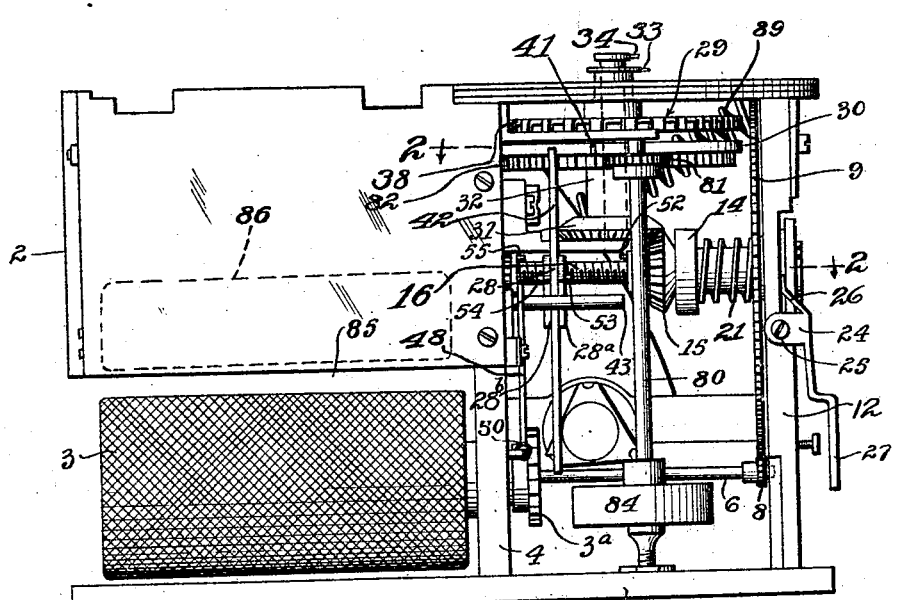
Figure 4 is a rear elevation of the machine with the casing removed.

Figure 11 is a vertical section taken about on the line 11—11 of Figure 10, certain parts being broken away; Figures 10 and 11 particularly illustrate the chart roller or rollers and the means for returning the indicating mechanism to the zero position; and Figure 12 is a detail plan and partial section illustrating a type of centrifugal governor which is shown in Figure 4 and is used in the machine for preventing racing of the indicating mechanism in returning to zero.

Referring more particularly to the parts, the machine includes a casing 1 which is removably placed over a frame 2 which carries the mechanism of the instrument. Mounted in the frame we provide a measuring roller 3 which is mounted so that it will be rotated as the fabric passes through the machine. The rotation of this roller is imparted to driving mechanism which actuates the indicating mechanism of the instrument. According to our invention we provide a stop-member which is mounted in such a way that when the indicating mechanism moves, the stop-member moves progressively so that it travels along a path as the indicating mechanism moves. In this way the stop-member will operate to assume an extreme position at one end of its travel corresponding to the zero position of the indicating mechanism and it will assume another extreme position at the other end of its travel corresponding to the limit of the measuring capacity of the machine; we provide automatic means for actuating the stop-member in one of its extreme positions so that it will engage a part of the indicating mechanism and stop the same at the zero position; we provide means for actuating the stop-member in its other extreme position to engage a part actuated by the measuring roller, and in this way we arrest the measuring roller and stop the indicating mechanism at the limit of the measuring capacity of the machine. We do not limit ourselves to any particular details of the construction to effect this result, but in the present embodiment of the machine we provide means such as a feed screw on which the stop-member is mounted and this feed screw is rotated as the driving mechanism moves, thereby causing the stop-member to travel between its two extreme positions.

In the construction of machines of this character or kind, it is customary to provide a main frame plate which supports practically all the internal mechanism of the instrument. Heretofore the side of this plate has carried the cooperating pinions and gears which reduced the driving movement from the measuring roller to the indicating mechanism; according to our present invention we dispense with this gear train and we provide a very large gear wheel which is disposed near the outer end of the frame and adjacent to the wall of the casing, and we provide means for driving this large gear wheel from the measuring roller. This large gear wheel and the pinion which we employ for driving it, effects an immediate and very great reduction in movement; it has been impossible to accomplish this large movement reduction by gearing attached adjacent to the main frame plate because, on account of other parts attached to the frame plate, it was impossible to use a large gear, such as described. In this way, by providing a long shaft on the measuring roller we establish a sufficient movement reduction at one step to enable the driving mechanism to drive the indicating mechanism.

We shall now describe the preferred construction for effecting these results.

Figure 1:
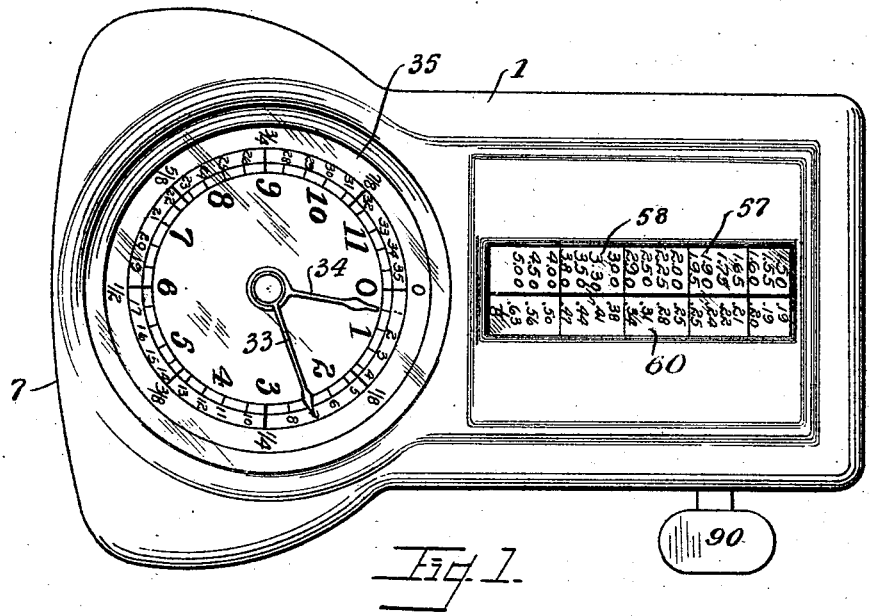
Figure 1 is a plan of the machine embodying our invention.

The frame 2 includes a substantially vertical main frame plate 4 which rotatably supports one end of the measuring roller 3, the lower end of the frame plate 4 being secured to a base plate 5 which constitutes a part of the frame. The measuring roller 3 carries a shaft 6 which extends from it so that its end lies near the vertical end wall 7 of the casing 1 (see Fig. 1). and at this point the shaft 6 carries a pinion 8 (Figure 4) which meshes with a large gear wheel 9 rotatably mounted on the frame 2, that is to say, the large gear wheel 9 is mounted to rotate in a vertical plane and disposed near the outer part of the frame 2 and near the vertical end wall 7 of the casing, the driving mechanism for operating the indicator being located in the space between the large gear wheel 9 and the frame plate 4. The large gear wheel 9 is secured to a sleeve 11 (see Fig. 2) which is rotatably mounted in a fixed vertical frame member 12 (Fig. 3) and the inner end of the sleeve 11 is formed into a head 13 which constitutes a clutch member co-operating with another clutch member 14, the latter clutch member being rigidly attached to a bevel gear 15 (Figs. 2 and 4) which is rigidly secured to a feed screw 16, the inner end of which is rotatably supported in the main frame plate 4. Within the sleeve 11 there is provided an inner shaft or stem 17 the inner end of which slides loosely into the outer side of the gear wheel 15; the sleeve 11 extends through a bushing 18 to which it is splined, as indicated at 19 (see Fig. 2), and this bushing carries the hub of the large gear wheel 9. Between the gear wheel 9 and the head 13 a coil spring 21 is provided; the outer end of the sleeve 11 carries rigidly an enlarged head 22 with a rabbet groove 23 on its inner edge. In the normal position of the parts the spring 21 holds the clutch closed and at this time the inner face of the head 22 lies adjacent to the outer face of the frame member 12.

In order to open the clutch we provide a small lever 24 (see Fig. 4) which is attached by pivot screws 25 to the side edges of the frame member 12 and has oppositely disposed ears 26 which project into the rabbet groove 23 on opposite sides of the head 22. The lower part of this lever 24 is formed into a thumb plate 27 which is disposed opposite to an opening (not illustrated) in the wall of the casing so that it can be operated through said opening.

Mounted as a nut on the feed screw 16, we provide a stop-member 28 (see Figs. 5 to 7); as the feed screw 16 rotates, this stop-member travels along it from one extreme position to the other. The manner in which this stop-member cooperates with the other parts will be described later.

The indicating mechanism 29 (Fig. 4) is driven by bevel gear wheels 15 and 31 of the driving mechanism, the latter of which is attached to the lower end of a vertical tubular shaft 32. This shaft extends upwardly and carries a fast moving pointer or hand 33 (see Fig. 1) which indicates inches, and rigid on this shaft 32 there is provided a stop-wheel 30. The function of this wheel 30 is to co-operate with the stop-member 28 to stop the indicating mechanism in the zero position. Through a suitable reducing mechanism a slow moving pointer 34 is driven, (see Fig. 1) and this pointer indicates yards. These pointers co-operate with a scale on a dial 35, indicating inches and yards and yard fractions. The limit of capacity of measuring movement in this machine illustrated, is twelve yards. The type of reducing mechanism embodied in this machine is the same as that illustrated in application Serial Number 310,753, of John L. Wheeler. This reducing mechanism includes an eccentric 36 (see Fig. 10) which is rigid with the tubular shaft 32 and this eccentric is rotatably mounted in a gear wheel 37, the teeth of which mesh internally with a slightly larger gear wheel 38; the gear wheel 37 has one less tooth than the gear 38 and carries a rigid arm 39 which projects toward the frame plate 4 and is guided to slide through an opening 40 in this frame plate (see Fig. 11). The operation of this reducing gear results in producing a 12-to-1 reduction of motion so that the gear wheel 38 is driven at the proper speed to carry the yard pointer 34.

Figure 2:
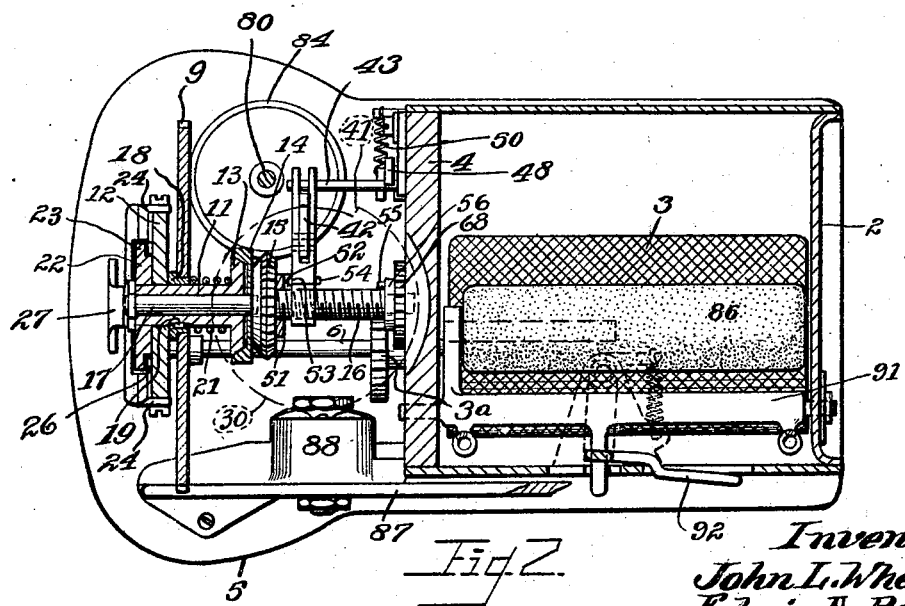
Figure 2 is a horizontal section taken approximately on a level with the axis of the clutch shaft of the machine, certain parts being shown in elevation or broken away.
Figure 3:
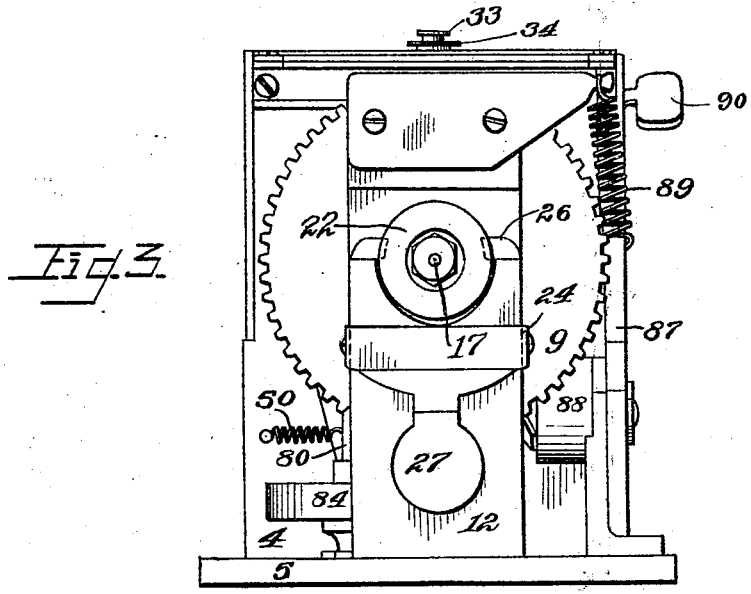
Figure 3 is an end elevation of the machine looking at the left hand end of Figure 1 with the casing removed.

In order to adapt the stop-wheel 30 to co-operate with the stop-member 28, this wheel is provided in its edge with a notch 41 (see Figs. 2 and 4). Referring to Figure 4, when the indicating mechanism is returning to the zero position, the stop-member 28 will be traveling toward the right; just as the indicating mechanism arrives at the zero position the stop-member is automatically actuated so that its upper end projects into the path of the notch 41, thereby stopping the indicating mechanism at zero. In order to accomplish this we construct the stop-member 28 so that it is not only capable of traveling along the feed screw, but it is also capable of rocking. Any suitable construction may be used to enable the stop-member to have this rocking movement. In the present instance we utilize the feed screw as a rocking axis, and construct the stop-member of two plates 28ª and 28ᵇ between which a stop lever 42 is carried; in the present instance the lever is rigidly held between the plates, and we provide means for yieldingly guiding the stop-member, which will permit the same to be rocked on the axis of the feed screw 16. For this purpose the ends of the plates 28ª and 28ᵇ are provided with notches 28ᶜ (Fig. 5) which engage with a horizontally disposed guide stem 43 (Figs. 2 and 6) which projects from a plate 45 attached on a pivot screw 46 on the side of the frame plate 4. This stem 43 is normally held in a neutral position by means of a notch 47 (Fig. 8) formed in the edge of a lever 48 which is pivoted at 49 on the side of the frame plate and actuated by a coil spring 50 (see Fig. 8); this lever 48 will evidently permit a slight lateral movement of the guide pin 43 and as the notch 47 is a V notch the spring 50 will always tend to return the stem 43 to the bottom of the notch, that is to say, it will tend to return the stem 43 to its neutral position. When the stop-member 28 is disposed at its extreme position toward the right end of its travel in Figure 4, it will lie adjacent to a collar 51 (Fig. 2) on screw 16, and this collar carries a projecting pin 52. As the rotation continues this pin strikes against a similar pin 53 which projects from the side of the stop-member 28; the relation of these pins when the stop-member is being actuated to stop the indicating mechanism at zero, is illustrated in Figure 7.

When the stop-member arrives at the inner end of its travel, that is at the left end of its travel as viewed in Figure 4, a pin 54 on the other side of the stop-member will come into the path of a pin 55 which projects from the face of a collar 56 which is rigidly carried by the inner end of the feed screw (see Fig. 2). This extreme position of the stop-member corresponds to the limit of the measuring capacity of the machine; when the pin 55 strikes the pin 54 it rocks the lower end of the lever 42 inwardly and toward the shaft 6 of the measuring roller. In this movement rotation takes place about the screw 16. Any suitable arrangement may be provided for enabling this movement of the stop-member to arrest the rotation of the measuring roller or the driving mechanism. In the present instance this is accomplished merely by providing a ratchet wheel or roller stop-wheel 3ª which is rigidly attached to the shaft 6 (see Fig. 6).

In the upper part of the casing and opposite to the dial 35, we provide a window 57, in which there is visible a fixed scale 58 (see Fig. 1) which scale carries numbers indicating prices for different priced goods. In the upper part of the casing at this point and adjacent to the scale 58, we provide a chart and means for moving this chart so as to present computed figures opposite the numbers on the scale 58. These computed figures indicate the charge to be made for the amount of goods measured off and indicated on dial 35. We do not limit ourselves to any particular construction or arrangement of the chart and its supporting chart roller or rollers. In the present instance this means includes a supply roller 59 (Fig. 10) upon which the chart 60 is normally wrapped. When the machine is in operation the chart is wound off of the supply roller 59 onto a take-up roller 61, the shaft 62 of which (see Fig. 10), carries a gear wheel 63 which is driven by a pinion 64. The shaft 65 of this pinion 64 is driven by a pinion 66 carried by the shaft on the other side of the frame plate 4 (see Fig. 6). The pinion 66 is driven by an idler 67 which is in turn driven by a pinion 68 rigidly secured to the inner end of the feed screw 16.

We provide means for returning the indicating mechanism to the zero position when the clutch 13—14 (Fig. 2) is open. For this purpose we provide a spiral spring 69 (see Fig. 10) which is disposed in a spring-barrel 70, the wall of which is secured at 71 to the outer end of the spring; the inner end of the spring is secured to a shaft 72 (see Fig. 11) and this shaft carries a rigid gear wheel 73 meshing with a pinion 74 which is rigidly secured to the shaft 75 of the supply roller 59. Now, when the chart 60 is drawn off of the roller 59, the rotation of its shaft 75 rotates the shaft 72 to which the inner end of the spring 69 is attached, and this winds up the spring. Hence, as soon as the clutch is open the spring 69 will exert its force to return to the indicating mechanism to zero.

In order to enable the tension of the spring 69 to be regulated, we provide the side of the spring-barrel with a ratchet wheel 76 and co-operating with this ratchet wheel we provide a detent pawl 77 (see Fig. 11) which is pivoted at 78 and normally held in engagement with the teeth of the ratchet wheel 76 by a coil spring 79. From an inspection of Figure 11, it will be evident that if the ratchet wheel 76 is rotated in a clockwise direction, the detent pawl 77 will slip on the teeth 76 and permit the tension of the spring to be increased, the detent pawl 77 operating to hold the spring barrel in its new position.

It will be noted that this spring 69 is disposed between the frame plate 4 and the roller 59.

In this machine we provide a novel location for a centrifugal governor. For this purpose we provide a vertical governor shaft 80 (see Figs. 4 and 10), the upper end of which carries a pinion 81 which meshes with a gear wheel 82 which is rigid with the tubular shaft 32 and bevel gear 31; this operates to drive the shaft 80 at a relatively high speed. The lower end of this shaft carries centrifugal governor weights 83 which fly out under the action of centrifugal force and rub the wall of fixed cup 84 in which the weights rotate. These weights 83 therefor, operate as brake shoes and their effectiveness as a brake increases proportionately with the speed of the machine in returning to zero.

In using the machine the edge of the fabric to be measured is introduced into a gap 85 (see Fig. 4) which is formed between the measuring roller 3 and a presser roller 86; the presser roller is then permitted to descend upon the measuring roller. The mechanism for this purpose forms no part of this invention. After the goods has been measured off, the edge of the fabric is notched or marked by means of a knife carried on a knife lever 87 (Figs. 2 and 10) which is pivoted at 88 and normally held elevated by a spring 89. This knife lever may be actuated by means of a thumb plate 90 which is accessible from the exterior of the machine. The presser roller 86 is mounted on a suitable rocking frame 91 with which co-operates a hand controlled latch 92 which may latch the presser roller in its elevated position. This lever is indicated in Figure 2, but this part of the mechanism is not completely illustrated as it forms no part of the invention.

We shall now describe briefly the complete mode of operation of the machine.

When the cloth is pulled past the measuring roller 3 it rotates the measuring roller and the rotation is imparted through the roller shaft 6 and pinion 8 (Fig. 4) to the large gear wheel 9; the rotation of this gear wheel 9 is imparted through the clutch 13—14 to the bevel gears 15 and 31 and thence through the shaft 32 to the pointers 33—34 on the dial 35. The rotation of the feed screw 16 by the large gear wheel 9 rotates the pinion 68 (Fig. 6) which imparts its motion through idler 67 to the shaft 65 and this drives the take-up roller 61 (see Figs. 5, 10 and 11). The take-up roller 61 pulls the chart 60 off the supply roller 59 and brings the figures on the chart past the scale 58.

If it is attempted to measure a greater length of goods than the capacity of the machine will permit, the machine will be automatically stopped at twelve yards, which is the limit of the measuring capacity. This arresting of the indicating mechanism is accomplished by the pin 55 cooperating with the pin 54 on the stop lever (see Figs. 4 and 6). This rocks the stop lever 42 into the path of the teeth of the ratchet wheel 3ª on the roller shaft and arrests the measuring roller.

After the desired quantity of cloth has been measured the operator of the machine actuates the knife lever to mark the edge of the fabric at the point where it is to be cut off, after which it opens the clutch 13—14 by pressing in on the thumb plate 27 (Fig. 2)

by opening the clutch, the spring 69 (Fig. 10) in the spring-barrel 70 will operate to rotate the supply roller 59 which will rewind the chart 60 upon this roller. At the same time the rotation of the roller 61 will be imparted back through the gears 63, 64, so as to rotate the feed screw and this will impart rotation through the gear wheels 15, 31 (Fig. 4) to the pointers or hands 33, 34. Just as the indicating mechanism arrives at zero, the stop-member 28 will have arrived at its extreme right hand position (see Fig. 4) at which time the pin 53 will come into the path of the pin 52 and this will rock the lever 42 in a clock-wise direction, thereby moving the upper end of the lever into the path of the notch 41 of the stop-wheel 30. This will stop the indicating mechanism in the zero position.

It is understood that the embodiment of the invention described herein is only one of the many embodiments our invention may take, and we do not wish to be limited in the practice of our invention nor in our claims, to the particular embodiment set forth.

What we claim is:

1. In a machine of the kind described, the combination of a frame, a measuring roller supported thereby and mounted so as to be rotated as the fabric passes through the machine, indicating mechanism, driving mechanism for actuating the indicating mechanism from the measuring roller, a stop-member, means for moving the stop-member progressively as the measuring movement progresses so that the stop-member travels as the indicating mechanism moves, and assumes an extreme position when the indicating mechanism is at its zero position, and automatic means for actuating the stop-member when in its extreme position, to stop the indicating mechanism in its zero position.

2. In a machine of the kind described, the combination of a frame, a measuring roller supported thereby and mounted so as to be rotated as the fabric passes through the machine, indicating mechanism, driving mechanism for actuating the indicating mechanism from the measuring roller, a stop-member, means for moving the stop-member progressively as the measuring movement progresses so that the stop-member travels as the indicating mechanism moves, and assumes an extreme position when the indicating mechanism is at the limit of the measuring movement of the machine, and automatic means for actuating the stop-member in said extreme position to arrest the rotation of the measuring roller at the limit of the measuring capacity of the machine.

3. In a machine of the kind described, the combination of a frame, a measuring roller supported thereby and mounted so as to be rotated as the fabric passes through the machine, indicating mechanism, driving mechanism for actuating the indicating mechanism from the measuring roller, a stop-member, means for moving the stop-member progressively as the measuring movement progresses, so that the stop-member travels as the indicating mechanism advances, said stop-member operating to assume one extreme position when the indicating mechanism is at its zero position, and a second extreme position when the indicating mechanism is at the limit of the measuring capacity of the machine, and automatic means for actuating the stop-member in the first named extreme position to stop the indicating mechanism at its zero position, and means for actuating the stop-member in the second named extreme position to arrest the measuring roller at the limit of the measuring capacity of the machine.

4. In a machine of the kind described, the combination of a frame, a measuring roller supported thereby and mounted so as to be rotated as the fabric passes through the machine, indicating mechanism including a stop-wheel mounted to rotate with the indicating mechanism, driving mechanism for actuating the indicating mechanism from the measuring roller, a stop-member to co-operate with the stop-wheel, means for moving the stop-member progressively as the indicating mechanism moves, so that the stop-member travels toward an extreme position adjacent the stop-wheel as the indicating mechanism approaches its zero position, and automatic means for actuating the stop-member when in its extreme position to rock the same into engagement with the stop-wheel, and thereby stop the indicating mechanism at its zero position.

5. In a machine of the kind described, the combination of a frame, a measuring roller supported thereby and mounted so as to be rotated as the fabric measured passes through the machine, a roller stop-wheel mounted to rotate in unison with the measuring roller, driving mechanism for actuating the indicating mechanism from the measuring roller, a stop-member mounted to rock, means for moving the stop-member progressively so that the stop-member travels toward an extreme position adjacent the roller stop-wheel as the indicating mechanism approaches the limit of its measuring capacity, and automatic means for rocking the stop-member when in this extreme position to move the same into engagement with the roller stop-wheel and thereby arrest the measuring roller at the limit of the measuring capacity of the indicating mechanism.

6. In a machine of the kind described, the combination of a frame, a measuring roller supported thereby and mounted so as to be rotated as the fabric passes through the machine, indicating mechanism, driving mechanism for actuating the indicating mechanism from the measuring roller, a stop-member to co-operate with the indicating mechanism, a feed screw operatively connected with the driving mechanism so as to move the stop-member progressively as the indicating mechanism moves, said stop-member having an extreme position corresponding to the zero position of the indicating mechanism, and automatic means for actuating the stop-member in the said extreme position when the indicating mechanism has substantially returned to zero, to move the stop-member into engagement with a part of the indicating mechanism and thereby stop the same in the zero position.

7. In a machine of the kind described, the combination of a frame, a measuring roller supported thereby and mounted so as to be rotated as the fabric passes through the machine, indicating mechanism, driving mechanism for actuating the indicating mechanism from the measuring roller, a roller stop-wheel carried by the measuring roller, a stop-member to co-operate with the roller stop-wheel, a feed screw connected with the driving mechanism so as to move the stop-member progressively as the indicating mechanism moves, said stop member having an extreme position corresponding to the limit of the measuring capacity of the indicating mechanism, and lying adjacent to said stop-wheel when in said extreme position, and automatic means for actuating the said stop-member when in the extreme position to move the same into engagement with the roller stop-wheel and thereby stop the same at the limit of the measuring capacity of the machine.

8. In a machine of the kind described, the combination of a frame, a measuring roller supported thereby and mounted so as to be rotated as the fabric passes through the machine, indicating mechanism, driving mechanism for driving the indicating mechanism from the measuring roller, a stop-member to co-operate with the indicating mechanism and mounted to travel into an extreme position in which it is capable of co-operating with a part of the indicating mechanism to stop the same, a feed screw for moving the stop-member progressively as the indicating mechanism moves, to move the stop-member into the said extreme position, and automatic means for actuating the stop-member when in the said extreme position, to move the same into engagement with a part of the indicating mechanism, and thereby stop the same.

9. In a machine of the kind described, the combination of a frame, a measuring roller supported thereby and mounted so as to be rotated as the fabric passes through the machine, indicating mechanism, driving mechanism for actuating the indicating mechanism from the measuring roller, a stop-member, means for mounting the same so as to travel, and to rock, means for moving the stop-member progressively as the indicating mechanism moves, toward an extreme position corresponding to the zero position of the indicating mechanism, or toward a second extreme position corresponding to the limit of the measuring capacity of the machine, and automatic means for actuating the stop-member at each of the extreme positions, to stop the indicating mechanism in the zero position, and also to stop the mechanism at the limit of the measuring capacity of the machine.

10. In a machine of the kind described, the combination of a frame, a measuring roller supported thereby and mounted so as to be rotated as the fabric passes through the machine, indicating mechanism, driving mechanism for actuating the indicating mechanism from the measuring roller, a feed screw, a stop-member mounted on the feed screw so as to be moved thereby progressively as the indicating mechanism moves, means for yieldingly guiding and supporting the stop-member to permit a rocking movement thereof, said stop-member having an extreme position corresponding to the zero position of the indicating mechanism, and automatic means for actuating the stop-member in the said extreme position when the indicating mechanism is returning to zero, to move the stop-member into engagement with a part of the indicating mechanism and thereby stop the same in the zero position.

11. In a machine of the kind described, the combination of a casing, a frame therein, a measuring roller rotatably mounted in the frame, a large gear wheel rotatably mounted in said frame disposed toward the wall of the casing and driven by the measuring roller, indicating mechanism, and driving mechanism located in the space between the roller and the large wheel and imparting movement from the large gear wheel to the indicating mechanism.

12. In a machine of the kind described, the combination of a casing, a frame therein, a measuring roller rotatably mounted in the frame, a large gear wheel rotatably mounted in the frame and lying adjacent to the side wall of the casing, means for driving the large gear wheel from the measuring roller, driving mechanism including a clutch located in the space between the measuring roller and the gear wheel, indicating mechanism driven by the driving mechanism, means for opening the clutch at will, and means for returning the indicating mechanism to zero when the clutch is open.

13. In a machine of the kind described, the combination of a casing, a frame therein, a measuring roller rotatably mounted in the frame, a large gear wheel supported on the frame and disposed remotely from the measuring roller, a pinion driven by the measuring roller and meshing with the gear wheel, indicating mechanism, and driving mechanism disposed in the space between the measuring roller and the large gear wheel and imparting movement from the large gear wheel to the indicating mechanism.

14. In a machine of the kind described, the combination of a casing, a frame therein, a measuring roller rotatably mounted in the frame, a large gear wheel supported in the frame and mounted to rotate in a substantially vertical plane, indicating mechanism including indicating pointers and a substantially vertical shaft driven by the gear wheel, said shaft being disposed in the space between the measuring roller and the gear wheel, and means for driving the gear wheel from the measuring roller.

15. In a machine of the kind described, the combination of a frame including a substantially vertical frame plate, a measuring roller rotatably mounted in the frame, a large gear wheel carried by the frame and mounted to rotate in a substantially vertical plane remote from the frame plate, driving mechanism driven by the gear wheel and disposed in the space between the frame plate and the gear wheel, means for driving the gear wheel from the measuring roller, and indicating mechanism actuated by the driving mechanism.

16. In a machine of the kind described, the combination of a frame including a substantially vertical frame plate, a measuring roller rotatably mounted in the frame, a large gear wheel carried by the frame and mounted to rotate in a substantially vertical plane remote from the frame plate, driving mechanism driven by the gear wheel and disposed in the space between the frame plate and the gear wheel, means for driving the gear wheel from the measuring roller, indicating mechanism actuated by the driving mechanism, the driving mechanism having a clutch, means for opening the clutch at will, and means for returning the indicating mechanism to the zero position when the clutch is open.

17. In a machine of the kind described, the combination of a frame, including a substantially vertical frame plate, a measuring roller rotatably mounted in the frame, a fixed scale, a chart to co-operate with the scale, means including a chart roller for carrying the chart, a return spring associated with the chart roller for returning the same to the zero position, and located between the roller and said frame plate, and means driven by the measuring roller for actuating the chart roller to move the chart.

18. In a machine of the kind described, the combination of a frame, including a substantially vertical frame plate, a measuring roller rotatably mounted in the frame, a fixed scale, a chart to co-operate with the scale, means including a supply roller for normally carrying the chart and a take-up roller for drawing the chart off of the supply roller, a return spring associated with the supply roller for returning the chart to the zero position and located between the supply roller and said frame plate, driving mechanism driven by the measuring roller for actuating the take-up roller and a clutch adapted to be opened at will to permit the spring to return the chart to zero.

19. In a machine of the kind described, the combination of a casing, a frame therein, a measuring roller mounted in the frame and having a shaft extending therefrom, a pinion carried by the outer end of the shaft, and lying near the wall of the casing, a large gear wheel rotatably mounted on the frame, meshing with the pinion and lying adjacent to the wall of the casing, driving mechanism located in the space between the measuring roller and the large gear wheel, and indicating mechanism driven by the driving mechanism.

20. In a machine of the kind described, the combination of a casing, a frame therein, a measuring roller mounted in the frame and having a shaft extending therefrom, a pinion carried by the outer end of the shaft, and lying near the wall of the casing, a large gear wheel rotatably mounted on the frame, meshing with the pinion and lying adjacent to the wall of the casing, driving mechanism located in the space between the measuring roller and the large gear wheel, indicating mechanism driven by the driving mechanism, said driving mechanism including a vertical shaft and a gear wheel carried thereby, a pinion meshing with the last named gear wheel, a vertically disposed governor shaft carrying the last named pinion, a centrifugal governor on the governor shaft, said driving mechanism including a clutch adapted to be opened at will; and means for returning the indicating mechanism to zero when the clutch is open.

In testimony whereof, we have hereunto set our hands.

JOHN L. WHEELER.
EDWIN A. REED.